United States Patent
Hayashi et al.

(10) Patent No.: US 6,784,643 B2
(45) Date of Patent: Aug. 31, 2004

(54) GENERAL-PURPOSE INDUCTION MOTOR ADAPTABLE FOR A PLURALITY OF TYPES OF AC POWER SUPPLY

(75) Inventors: Hidetoshi Hayashi, Ohbu (JP); Takuya Nagayasu, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 48 days.

(21) Appl. No.: 10/098,162

(22) Filed: Mar. 15, 2002

(65) Prior Publication Data

US 2002/0145343 A1 Oct. 10, 2002

(30) Foreign Application Priority Data

Mar. 15, 2001 (JP) ......................................... 2001-74001

(51) Int. Cl.[7] .......................... H02H 7/06; H02P 11/00; H02P 9/00
(52) U.S. Cl. .............................. 322/24; 322/17; 322/22; 322/23
(58) Field of Search ............................... 322/17, 22–24

(56) References Cited

U.S. PATENT DOCUMENTS

| | | | |
|---|---|---|---|
| 3,678,355 A | * | 7/1972 | Burek et al. ................ 318/756 |
| 4,908,565 A | * | 3/1990 | Cook et al. .................... 322/10 |
| 4,926,104 A | * | 5/1990 | King et al. .................. 318/599 |
| 4,926,105 A | * | 5/1990 | Mischenko et al. ......... 318/800 |
| 4,958,119 A | * | 9/1990 | Fitzner ........................ 322/91 |
| 5,091,688 A | * | 2/1992 | Ewald et al. .................... 322/8 |
| 5,581,168 A | * | 12/1996 | Rozman et al. ............. 318/723 |
| 5,793,189 A | * | 8/1998 | Kawaguchi et al. .......... 322/28 |
| 5,838,085 A | * | 11/1998 | Roesel et al. ............... 310/113 |
| 5,969,957 A | * | 10/1999 | Divan et al. .................. 363/36 |
| 5,990,590 A | * | 11/1999 | Roesel et al. ............... 310/113 |
| 5,998,880 A | * | 12/1999 | Kumar ..................... 290/40 B |
| 6,157,175 A | * | 12/2000 | Morinigo et al. ............. 322/28 |
| 6,320,286 B1 | * | 11/2001 | Ramarathnam .............. 310/50 |
| 6,392,371 B1 | * | 5/2002 | Cheng et al. ............... 318/158 |

* cited by examiner

Primary Examiner—Nicholas Ponomarenko
Assistant Examiner—Pedro J. Cuevas
(74) Attorney, Agent, or Firm—Squire, Sanders & Dempsey L.L.P.

(57) ABSTRACT

In a general-purpose induction motor, a three-phase induction motor 10 is provided with a terminal box containing terminals for electrical connection and a conversion module 30 contained in the terminal box and coupled to the three-phase induction motor. The conversion module has a function of converting a plurality of types of single-phase AC into a single type of three-phase AC. With this structure, the general-purpose induction motor can be used with the single-phase AC.

10 Claims, 4 Drawing Sheets

GENERAL-PURPOSE INDUCTION MOTOR ADAPTABLE FOR A PLURALITY OF TYPES OF AC POWER SUPPLY

BACKGROUND OF THE INVENTION

This invention relates to an induction motor and, in particular, to an improvement of a three-phase induction motor combined with a deceleration mechanism to be used as a gear motor.

Existing induction motors used as a gear motor are classified into a single-phase induction motor and a three-phase induction motor. As the single-phase induction motor, a capacitor motor is known. In either event, a deceleration mechanism is directly coupled to an output shaft of the single-phase or the three-phase induction motor when it is used as the gear motor.

Generally, the single-phase induction motor is larger in volume and produces greater noise and vibration than the three-phase induction motor. In spite of the above-mentioned disadvantages, the single-phase induction motor is inevitably used in a place, such as an ordinary house, where three-phase AC is unavailable but single-phase AC alone can be used. It is therefore desired to suppress the noise and the vibration of the induction motor even in the place where the single-phase AC alone is available.

On the other hand, in case where the gear motor is provided, consideration must be made about the phase type of an available AC power supply, i.e., whether the gear motor is used with the single-phase AC or the three-phase AC. Thus, considering the potential use of the gear motor with the single-phase AC or the three-phase AC, both of the single-phase induction motor and the three-phase induction motor must be produced and kept in stock as induction motors each of which is to be combined with a deceleration mechanism. This means that a stock of the induction motors is increased in number and that a stock of parts for maintenance purpose is also increased in number. This is because those parts for both of the single-phase and the three-phase induction motors must be kept in stock.

Furthermore, the AC power supply has a frequency type. The frequency is, for example, 50 Hz or 60 Hz. In this case, the induction motor is operated at a single frequency of 50 Hz or 60 Hz. In order to obtain a desired rotation speed or rpm, a deceleration ratio of the deceleration mechanism must particularly and minutely be set.

In order to prevent burnout of the induction motor, a thermal relay must be provided separately from the induction motor.

SUMMARY OF THE INVENTION

It is therefore an object of this invention to provide a general-purpose induction motor adaptable for a user's request or for a particular type of an AC power supply available in a local area where it is installed.

A general-purpose induction motor according to this invention includes a three-phase induction motor provided with a terminal box containing terminals for electrical connection. According to an aspect of this invention, the general purpose induction motor further comprises a conversion module contained in the terminal box and coupled to the three-phase induction motor. The conversion module has a function of converting a plurality of types of single-phase AC into a single type of three-phase AC so that the three-phase induction motor can be used with the single-phase AC.

The conversion module comprises a converter for converting the single-phase AC into DC, a capacitor for smoothing the DC as an output of the converter to produce smoothed DC, an inverter for converting the smoothed DC into the three-phase AC, a current/voltage detecting circuit for detecting a DC current/voltage to produce a current/voltage detection signal, a drive circuit for driving the inverter, and a first microcomputer for controlling the drive circuit in response to the current/voltage detection signal from the current/voltage detecting circuit.

The conversion module is coupled to a circuit board comprising a second microcomputer and having at least one of a frequency setting function, an acceleration/deceleration time setting function for soft start/stop, and an electronic thermal relay function.

DESCRIPTION OF THE PREFERRED EMBODIMENT

Figure 1:
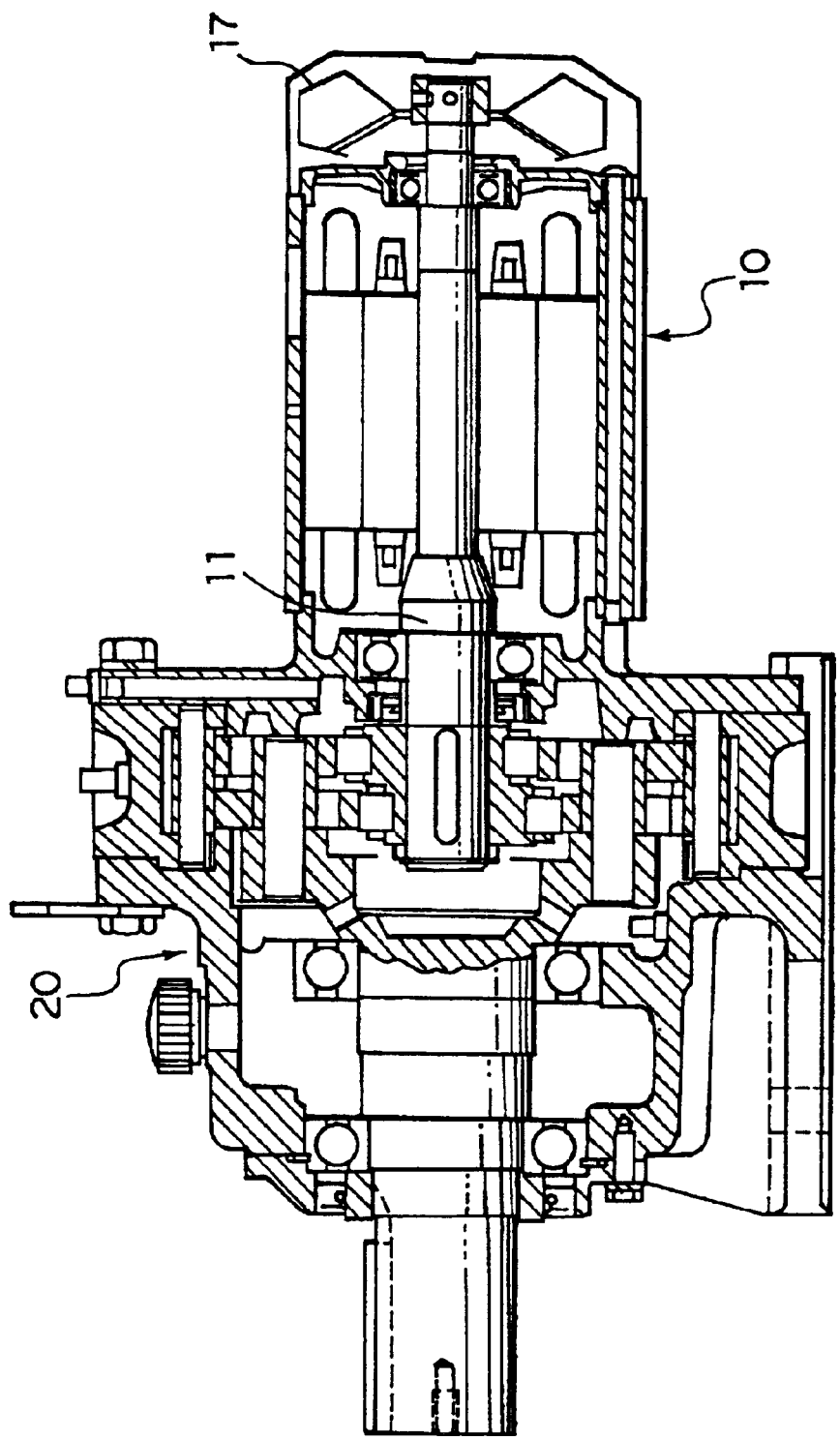
FIG. 1 is a sectional view showing an internal structure of a gear motor.

Now, description will be made of an embodiment of this invention with reference to the drawing.

Referring to FIG. 1, description will at first be made of a gear motor as a combination of a three-phase induction motor 10 and a deceleration mechanism 20. Specifically, the deceleration mechanism 20 is directly coupled to an output shaft (rotation shaft) 11 of the three-phase induction motor 10. A cooling fan 17 is attached to the rotation shaft. The structure of each of the three-phase induction motor 10 and the deceleration mechanism 20 is well known and the detailed description thereof is omitted herein. A general-purpose induction motor according to this invention is suitable for use as the above-mentioned gear motor.

Figure 2:
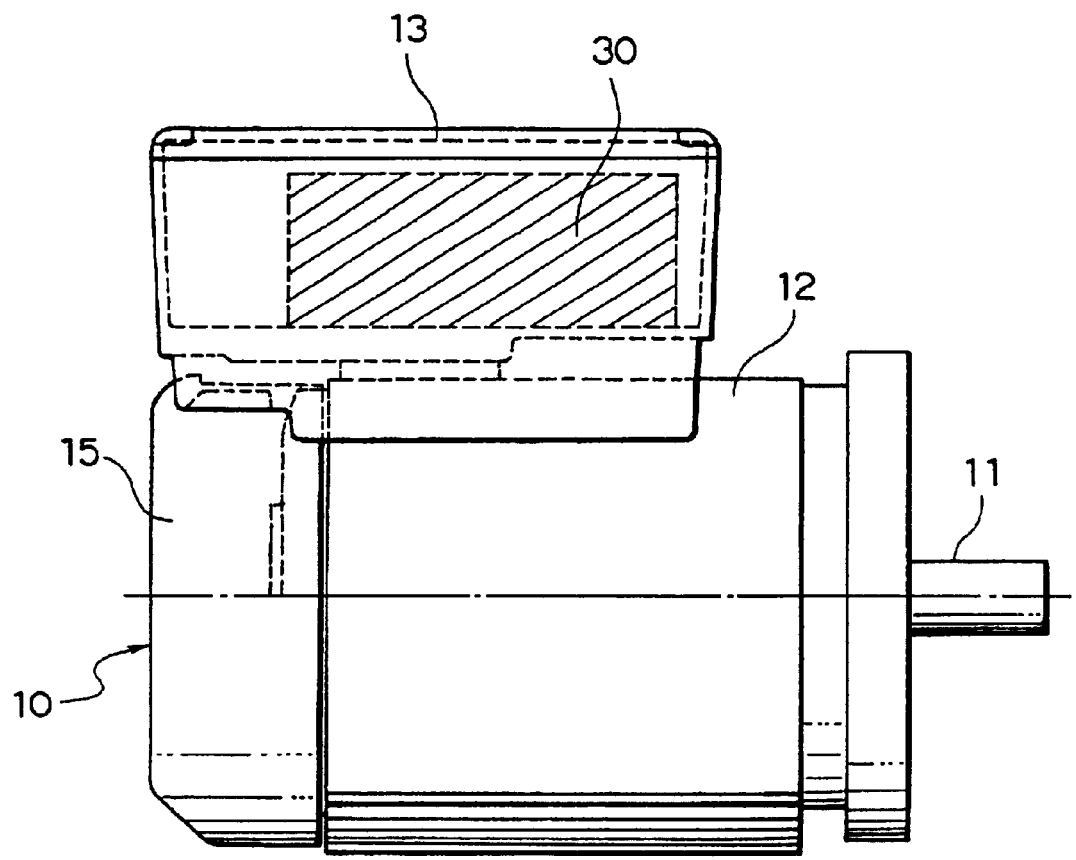
FIG. 2 shows, partially in section, a general-purpose induction motor according to an embodiment of this invention.
Figure 3:
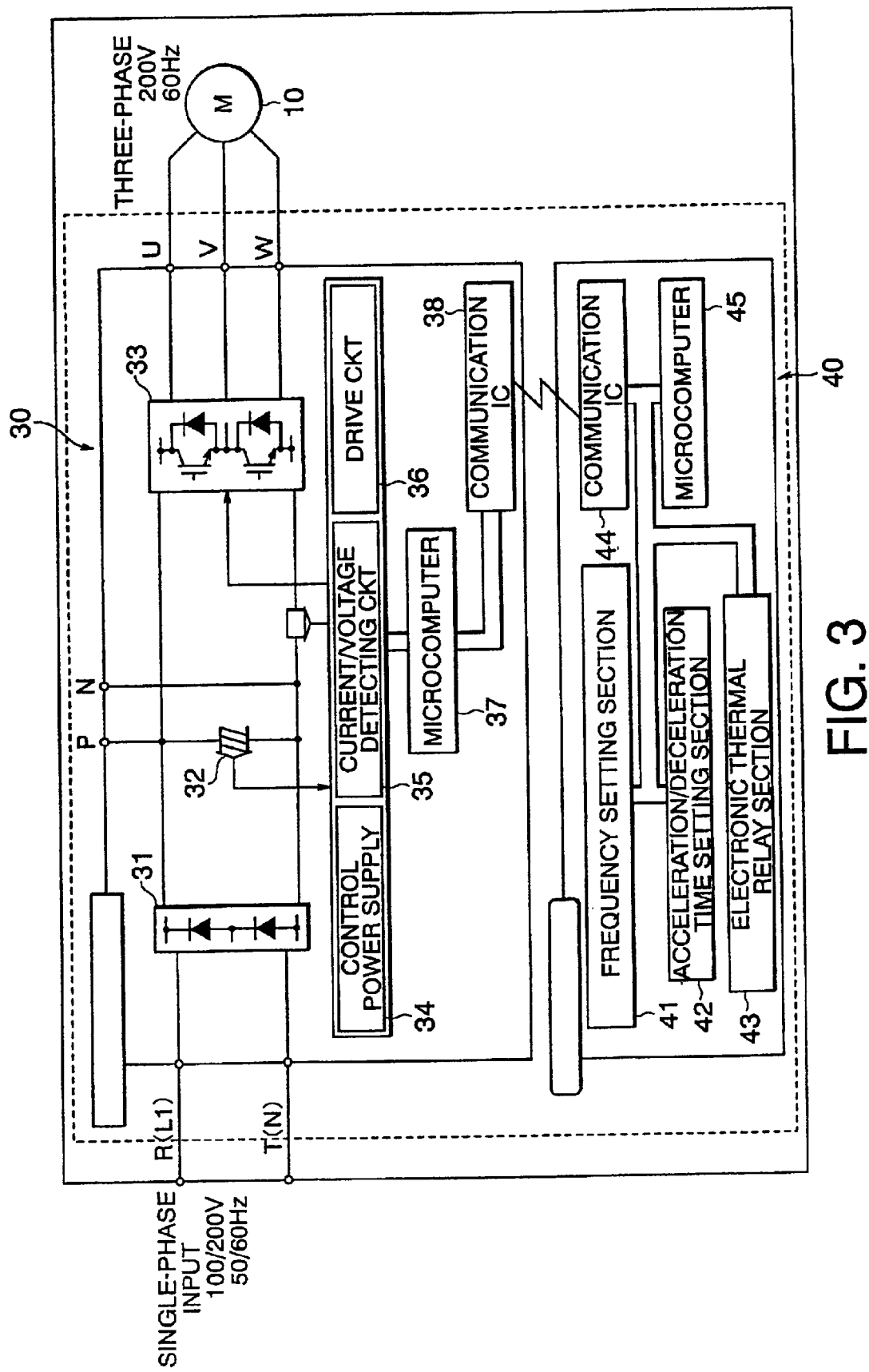
FIG. 3 shows a circuit structure of a conversion module illustrated in FIG. 2 and a circuit board connected thereto.

Referring to FIGS. 2 through 4, description will be made of a general-purpose induction motor according to a preferred embodiment of this invention. In FIG. 2, the general-purpose induction motor according to the embodiment of this invention comprises the three-phase induction motor 10 having an outer casing 12, and a conversion module 30 mounted on the outer casing 12. The conversion module 30 has a function of converting single-phase AC into three-phase AC. On an upper part of the outer casing 12 of the three-phase induction motor 10, a terminal box 13 is mounted. The terminal box 13 contains various kinds of terminals (not shown) for connection with an AC power supply when the three-phase induction motor 10 is installed at a location where it is used. The terminal box 13 has a cover which can be opened and closed. The conversion module 30 is contained in the terminal box 13. In FIG. 2, the deceleration mechanism (20 in FIG. 1) is not illustrated.

In FIG. 3, the conversion module 30 comprises a converter 31 for converting the single-phase AC into DC, a capacitor 32 for smoothing the DC as an output of the converter 31 into smoothed DC, and an inverter 33 for converting the smoothed DC into the three-phase AC. The inverter 33 is connected to three-phase terminals U, V, and W which are preliminarily connected to three-phase input terminals of the three-phase induction motor 10 at the factory shipment. This means that, upon installing the general-purpose induction motor, input terminals R and T are simply connected to the single-phase AC. Such mode of connection is similar to that of a single-phase induction motor. The conversion module 30 also comprises a control power supply 34 for producing control power, a current/voltage detecting circuit 35, and a drive circuit 36 for driving the inverter 33. The conversion module 30 further comprises a microcomputer (first microcomputer) 37 for controlling the drive circuit 36 in response to an electric current or an electric voltage detected by the current/voltage detecting circuit 35. The conversion module 30 still further comprises a communication IC (Integrated Circuit) 38 for connecting or coupling to an external circuit with a wire or wireless.

The conversion module of the type is an inexpensive device having minimum functions as a so-called inverter unit. The conversion module is commercially sold, for example, in the name of IPM (Intelligent Power Module) and used for purposes different from that of this invention. In any event, the conversion module 30 is adaptable for various types of AC power supply. For example, the conversion module 30 is adaptable for single-phase 100V or 200V and for a rated frequency of 50 Hz or 60 Hz. This invention focuses upon the fact that the above-mentioned conversion module is applicable to the three-phase induction motor 10 of a 200V class.

As a result of the above-mentioned combination, the general-purpose induction motor according to the embodiment can be operated with the single-phase AC and therefore serves as a single-phase induction motor.

In the general-purpose induction motor according to the embodiment, the conversion module 30 is connected to a circuit board 40 through the communication IC 38. The circuit board 40 includes a frequency setting section 41, an acceleration/deceleration time setting section 42, an electronic thermal relay section 43, a communication IC 44 for connecting or coupling to the communication IC 38, and a microcomputer (second microcomputer) 45.

The frequency setting section 41 has a function of setting a frequency of an AC power supply available in a local area where the general-purpose induction motor is installed. For example, the AC power supply may have a rated frequency which is equal to 50 Hz in one area and 60 Hz in another area. The above-mentioned frequency setting function enables the general-purpose induction motor to be used in either area.

The acceleration/deceleration time setting section 42 has a function of setting an acceleration/deceleration time for soft start/stop well known in the art. The soft start is a function of varying or raising an output frequency to a predetermined value in a linear slope or a curved slope under a limitation of a preselected rate in case where a frequency setting value for controlling the inverter 33 rapidly becomes a high. On the contrary, the soft stop is a function of varying or lowering an output frequency to a predetermined value in a linear slope or a curved slope under a limitation of a preselected rate in case where the frequency setting value for controlling the inverter 33 rapidly becomes a low. The acceleration time is a set time for acceleration from 0 Hz up to a highest frequency while the deceleration time is a set time for deceleration from the highest frequency down to 0 Hz.

The electronic thermal relay section 43 has a function of preventing burnout of the three-phase induction motor 10 when an excessive current flows therethrough. Specifically, the electronic thermal relay section 43 has a function of turning off the inverter 33 when the electric current flowing through the conversion module 30 exceeds a predetermined level.

The circuit board 40 has an input portion (not shown) for changing or inputting set values for the frequency setting section 41, the acceleration/deceleration time setting section 42, and the electronic thermal relay section 43. The microcomputer 45 transmits setting information of each of the frequency setting section 41, the acceleration/deceleration time setting section 42, and the electronic thermal relay section 43 through the communication IC 44 to the microcomputer 37 of the conversion module 30.

In response to frequency setting information from the microcomputer 45, the microcomputer 37 controls the inverter 33 through the drive circuit 36. Furthermore, the microcomputer 37 controls the soft start or the soft stop in response to the acceleration time or the deceleration time setting information from the microcomputer 45. Furthermore, when the electric current detected by the current/voltage detecting circuit 35 exceeds the predetermined level set in the electronic thermal relay section 43, the microcomputer 37 turns off the inverter 33. Thus, the thermal relay function is realized.

The circuit board 40 may comprise at least one of the frequency setting section 41, the acceleration/deceleration time setting section 42, and the electronic thermal relay section 43.

In the meanwhile, the conversion module 30 generates heat because the inverter 33 uses a power element. Therefore, the conversion module 30 is preferably provided with a cooling mechanism. In the general-purpose induction motor according to this embodiment, the cooling mechanism is implemented by utilizing a part of a cool wind from the cooling fan 17 of the three-phase induction motor 10.

Figures 4A, 4B:
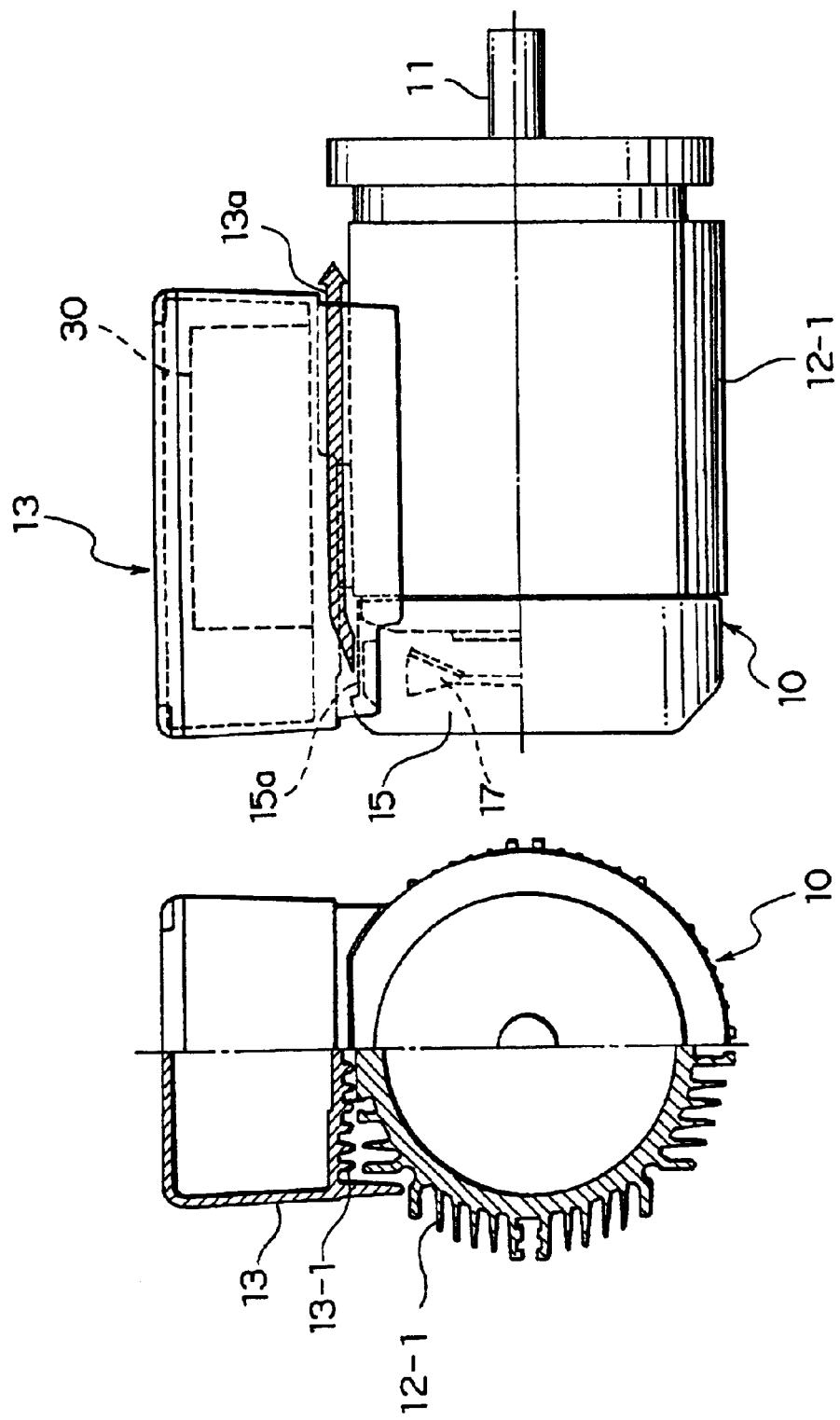
FIGS. 4A and 4B show, partially in section, a cooling structure of the conversion module illustrated in FIG. 2.

Referring to FIGS. 4A and 4B, description will be made of the cooling mechanism of the conversion module 30. In FIGS. 4A and 4B, the three-phase induction motor 10 is provided with a plurality of cooling fins (first cooling fins) 12-1 formed on the outer casing 12. The three-phase induction motor 10 has a fan housing 15 containing the cooling fan 17. The conversion module 30 is located so that its heat generating portion is brought into contact with an internal bottom surface of the terminal box 13. The terminal box 13 has an external bottom surface provided with a plurality of cooling fins (second cooling fins) 13-1. The fan housing 15 has an upper casing provided with an opening 15a communicating with a lower part of the terminal box 13. As a consequence, an air duct defined by the cooling fins 13-1 of the terminal box 13 and the cooling fins 12-1 of the outer casing 12 is formed between the terminal box 13 and the three-phase induction motor 10. Thus, a part of the cool wind from the cooling fan 17 in the fan housing 15 pass through the air duct to cool the lower part of the terminal box 13 and is exhausted through a slit 13a formed at a position opposite to the opening 15a. In the above-mentioned manner, air cooling of the conversion module 30 is realized. In FIGS. 4A and 4B, the deceleration mechanism (20 in FIG. 1) is not illustrated.

As described above, the conversion module 30 is adaptable for the single-phase 100V or 200V and the rated frequency of 50 Hz or 60 Hz and is applicable to the three-phase induction motor 10 of a 200V class. Furthermore, by separately providing another conversion module having a converting function for conversion from three-phase 400V into three-phase 200V for the three-phase induction motor of a 200V class, the general-purpose induction motor is applicable not only to the single-phase AC but also to the three-phase AC of different rated voltages. This means that the use of the general-purpose induction motor does not depend upon a user's request for motor specification or the type of the AC power supply available at the place where it is installed. In other words, it is possible to meet various requests for motor specification simply by producing the three-phase induction motors of a 200V class and keeping such a single type of products in stock, provided that a plurality of types of conversion modules are prepared. This results in an increase in production efficiency. It will readily be understood that the general-purpose induction motor according to this invention is applicable not only to the gear motor but also to other various purposes.

What is claimed is:

1. A general-purpose induction motor comprising a three-phase induction motor provided with a terminal box containing terminals for electrical connection and a conversion module contained in said terminal box and coupled to said three-phase induction motor, said conversion module having a function of converting a plurality of types of single-phase AC into a single type of three-phase AC so that said general-purpose induction motor can be used with the single-phase AC, said conversion module comprising a converter for converting the single-phase AC into DC, a capacitor for smoothing the DC as an output of said converter into smoothed DC, an inverter for converting the smoothed DC into the three-phase AC, a current/voltage detecting circuit for detecting a DC current/voltage to produce a current/voltage detection signal, a drive circuit for driving said inverter, and a first microcomputer for controlling said drive circuit in response to said current/voltage detection signal from said current/voltage detecting circuit.

2. A general-purpose induction motor as claimed in claim 1, wherein said conversion module is adaptable for an input of single-phase 100V or 200V and a frequency of 50 Hz or 60 Hz, said three-phase induction motor being a 200V class induction motor.

3. A general-purpose induction motor as claimed in claim 1, wherein said conversion module is coupled to a circuit board including a second microcomputer and having at least one of a frequency setting function, an acceleration time/deceleration time setting function for soft start/stop, and an electronic thermal relay function.

4. A general-purpose induction motor as claimed in claim 1, further comprising a cooling fan, said terminal box being mounted on an outer casing of said three-phase induction motor, said conversion module having a heat generating portion and placed in said terminal box, said conversion module in said terminal box being cooled by a part of a cool wind flowing from said cooling fan through a space between said terminal box and said outer casing.

5. A general-purpose induction motor as claimed in claim 4, wherein said outer casing is provided with a plurality of first cooling fins, said terminal box being provided with a plurality of second cooling fins formed on an external bottom surface thereof, the above-mentioned part of the cooling wind from said cooling fan passing through an air duct defined between said first and said second cooling fins.

6. A general-purpose induction motor as claimed in claim 1, wherein said general-purpose induction motor is provided with a deceleration mechanism coupled to an output shaft thereof and serves as a gear.

7. A general-purpose induction motor comprising a three-phase induction motor and a conversion module coupled to said three-phase induction motor, said conversion module having a function of converting a plurality of types of single-phase AC into a single type of three-phase AC so that said general-purpose induction motor can be used with the single-phase AC, said conversion module comprising a converter for converting the single-phase AC into DC, a capacitor for smoothing the DC as an output of said converter into smoothed DC, an inverter for converting the smoothed DC into the three-phase AC, a current/voltage detecting circuit for detecting a DC current/voltage to produce a current/voltage detection signal, a drive circuit for driving said inverter, and a first microcomputer for controlling said drive circuit in response to said current/voltage detection signal from said current/voltage detecting circuit.

8. A general-purpose induction motor as claimed in claim 7, wherein said conversion module is adaptable for an input of single-phase 100V or 200V and a frequency of 50 Hz or 60 Hz, said three-phase induction motor being a 200V class induction motor.

9. A general-purpose induction motor as claimed in claim 7, wherein said conversion module is coupled to a circuit board including a second microcomputer and having at least one of a frequency setting function, an acceleration time/deceleration time setting function for soft start/stop, and an electronic thermal relay function.

10. A general-purpose induction motor as claimed in claim 7, wherein said general-purpose induction motor is provided with a deceleration mechanism coupled to an output shaft thereof and serves as a gear.

* * * * *